US010144037B2

(12) United States Patent
Hanson et al.

(10) Patent No.: US 10,144,037 B2
(45) Date of Patent: Dec. 4, 2018

(54) SYSTEM AND METHOD FOR ADJUSTING CONTENTS OF AN AUTOMATION TRAY

(71) Applicant: Toshiba International Corporation, Houston, TX (US)

(72) Inventors: Bruce H. Hanson, Endicott, NY (US); Jeffrey Anthony Gavenas, Grapevine, TX (US)

(73) Assignee: Toshiba International Corporation, Houston, TX (US)

( * ) Notice: Subject to any disclaimer, the term of this patent is extended or adjusted under 35 U.S.C. 154(b) by 124 days.

(21) Appl. No.: 15/426,864

(22) Filed: Feb. 7, 2017

(65) Prior Publication Data

US 2017/0232476 A1 Aug. 17, 2017

Related U.S. Application Data

(60) Provisional application No. 62/295,344, filed on Feb. 15, 2016.

(51) Int. Cl.
*B07C 3/00* (2006.01)
*B65H 31/30* (2006.01)
*B65G 65/00* (2006.01)

(52) U.S. Cl.
CPC ............ *B07C 3/008* (2013.01); *B65G 65/005* (2013.01); *B65H 31/30* (2013.01); *B65H 2301/422542* (2013.01); *B65H 2701/1916* (2013.01)

(58) Field of Classification Search
USPC .......................................................... 700/223
See application file for complete search history.

(56) References Cited

U.S. PATENT DOCUMENTS

| | | | | | |
|---|---|---|---|---|---|
| 5,347,790 | A * | 9/1994 | Romanenko | B07C 3/008 | 414/790.3 |
| 7,210,893 | B1 * | 5/2007 | Overman | B07C 3/008 | 209/900 |
| 2005/0281662 | A1 * | 12/2005 | Carey | B65G 13/12 | 414/765 |
| 2008/0164185 | A1 * | 7/2008 | Stemmle | B07C 3/08 | 209/584 |
| 2013/0294879 | A1 * | 11/2013 | Middleberg | B65H 31/06 | 414/798.2 |

* cited by examiner

*Primary Examiner* — Kyle O Logan
(74) *Attorney, Agent, or Firm* — Baker Botts L.L.P.

(57) ABSTRACT

Presently disclosed embodiments are directed to a system and method for controlling/adjusting a position of mail product or other contents in an automated mail tray. Specifically, the disclosed embodiments utilize an automated mail tray with a ridged construction to allow automation equipment to adjust, load, and unload mail product in a structured manner. An adjustment feature, along with a moveable bottom surface of the mail tray, may be used to adjust a position of mail product in the automated mail tray into a vertical position. In some embodiments, the system may actuate the adjustment feature in response to sensor feedback that the mail product has fallen from the vertical position. Once the mail is in the vertical position, the moveable tray bottom may lift the mail product until it is elevated out of the tray for movement into other automation equipment without tray wall interference.

20 Claims, 9 Drawing Sheets

SYSTEM AND METHOD FOR ADJUSTING CONTENTS OF AN AUTOMATION TRAY

CROSS REFERENCE TO RELATED APPLICATIONS

This application claims priority to U.S. Provisional Application Ser. No. 62/295,344, entitled "System and Method for Adjusting Contents of an Automation Tray," filed Feb. 15, 2016, which is herein incorporated by reference in its entirety.

TECHNICAL FIELD

Embodiments of the present disclosure relate to mail handling and processing systems for mail and related articles and, more particularly, to systems and methods for adjusting the contents in an automated mail receiving tray.

BACKGROUND

Mail received at a post office or other location is sorted or otherwise processed so that it can be directed to a desired location. To accomplish this function, sortation machines with output pockets are used to sort various mail products. Typically, the product that arrives in the output pockets of a sortation machine is removed manually and placed in movable containers, trays, or other containing devices so that it can be moved through additional sortation processes or dispatched to arrive at its intended destination. As an example, letters sorted on a Delivery Bar Code Sorter (DBCS) arrive in letter trays. An operator manually moves the letters from the trays onto a feeder load ledge to begin the sort process. Once sorted to the sorter pockets of the DBCS, an operator removes the letters from the output pockets and places them in a labeled letter tray so they can be transported to the next processing step.

More advanced sortation/feeder systems can be automated in a number of ways. Some utilize automation trays with a moveable bottom that can lift mail contents upward so that mail can be swept from the tray to another location. Unfortunately, if the automation tray is not completely filled with mail product, the mail can fall over within the automation tray. This can lead to undesirable damage of the mail product as automation equipment attempts to sweep the non-vertical mail out of the tray. Therefore, it is now recognized that a need exists for an efficient and simple to operate mechanism for controlling a position of mail within an automated mail tray.

SUMMARY

In accordance with the above, presently disclosed embodiments are directed to a system and method for controlling/adjusting a position of mail product or other contents in an automated mail tray. In general, a partially full mail tray is not able to keep a stack of vertically oriented mail product from falling over on its side while the mail product is being elevated in the tray by a moveable tray bottom. If the mail in the tray falls over, then an automated sweeping mechanism may damage or fail to effectively sweep the mail away from the tray. To prevent this condition, the disclosed system will first recognize that the mail has fallen and then correct the placement of the mail back into a vertical position.

To that end, the system may include an automated mail tray with a ridged construction to allow automation equipment to adjust, load, and unload mail product in a structured manner. In some embodiments, the system may include an automated mail tray and an adjustment feature that is able to adjust a position of the mail product disposed in the mail tray. The automated mail tray may include a moveable bottom surface that can be elevated with or without contents being present until the bottom surface reaches the heights of the side walls of the mail tray. The same effect may be accomplished by moving the side walls down from the bottom surface.

The automated mail tray may have slots formed in the bottom surface of the mail tray. The adjustment feature may include a set of fingers that is designed to be inserted through the slots in the bottom surface of the mail tray. For example, the adjustment feature may include a ramp formed from profiled fingers designed to be inserted from beneath the bottom surface to push the mail toward a relatively vertical position within the mail tray. Additional sets of fingers on automated paddles may be moved through the spaces in the ramp to sweep the mail product out of the mail tray when the bottom surface is in an elevated position. Such a system allows the automated equipment (paddles) to move any desirable amount of mail product out of the automated mail tray while maintaining the mail product in a vertical position so that it is not damaged.

In other embodiments, the system may include an automated mail tray and one or more sensors for detecting a position of mail product in the tray by looking through holes (or some other opening) in the tray. The holes may be disposed through a side wall of the automated mail tray, or through a bottom surface of the automated mail tray. The system also includes an adjustment feature that may be used to adjust a position of contents in the automated mail tray. The adjustment feature may include fingers that are able to access the contents of the mail tray through slots in a bottom surface of the mail tray.

The mail tray may include a moveable bottom surface. The moveable bottom surface may be elevated with or without contents being present until the bottom surface reaches the height of the side walls of the mail tray. The moveable bottom surface may be moved upward such that the mail tray bottom remains perpendicular with the side walls of the automated mail tray. In some embodiments, the moveable bottom may also be able to pivot about one end to angle the bottom so that it is not perpendicular to the tray walls. The moveable bottom may be pivoted in this manner to aid the adjustment feature in controlling a position/orientation of the mail product in the tray.

The system may further include a controller communicatively coupled to the sensors, the adjustment feature, and various actuators for moving the bottom of the mail tray. The controller detects, based on signals received from the sensors, when the mail product has fallen from a vertical orientation within the automated mail tray. The controller may then output appropriate signals to actuate the adjustment feature and/or the moveable tray bottom to bring the mail product back to a desired vertical position. Once the mail is in the vertical position, the moveable tray bottom may lift the mail product to a position where the mail tray bottom is perpendicular with and disposed at the upper level of the mail tray walls. This allows the mail contents to be elevated out of the tray for movement into other automation equipment without tray wall interference.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Figure 1:
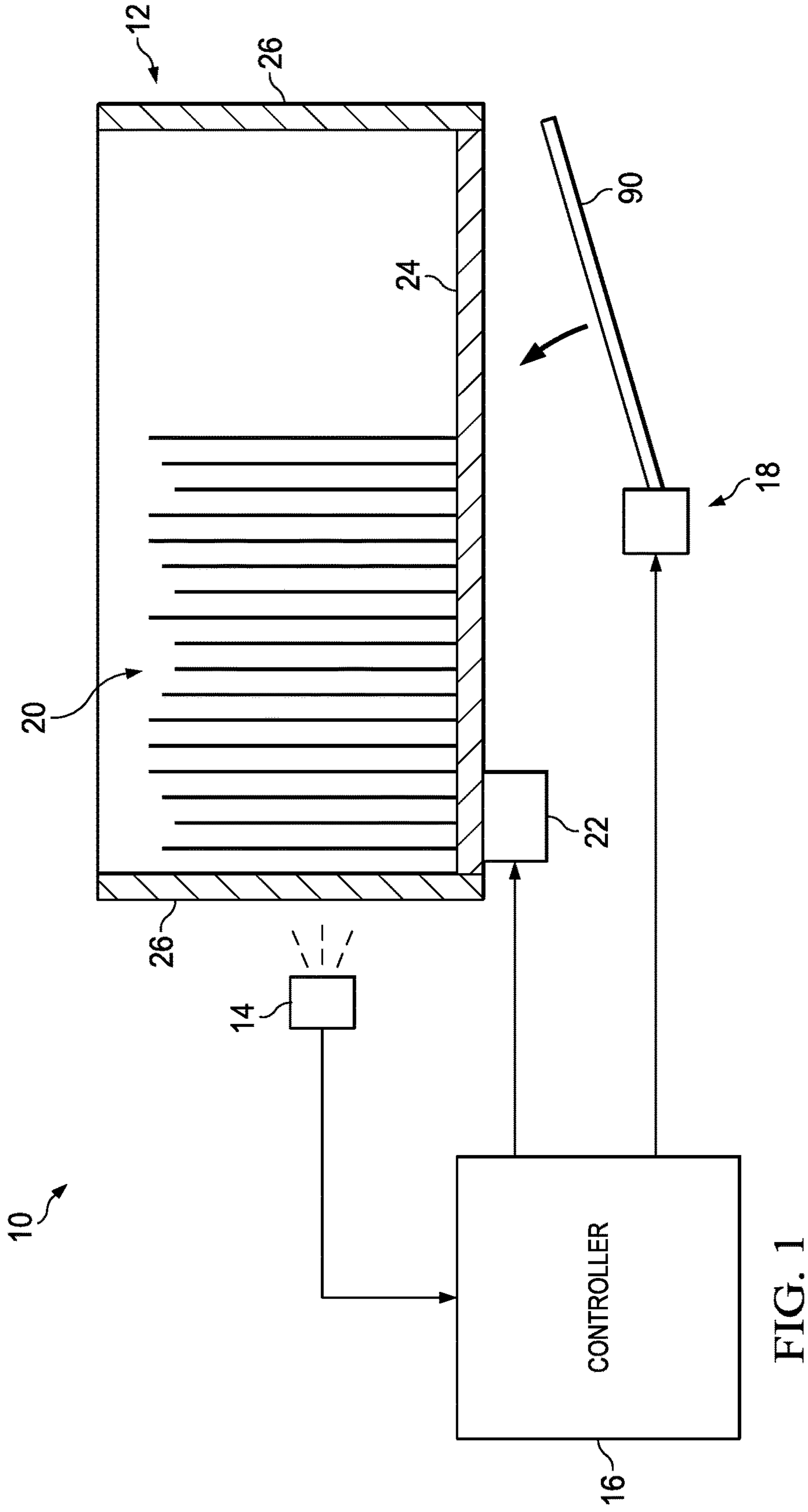
FIG. 1 is a schematic block diagram of an automated mail tray and a system for adjusting contents in the mail tray, in accordance with an embodiment of the present disclosure.

Turning now to the drawings, FIG. 1 illustrates a system 10 for adjusting a position of mail products 20 in an automated mail tray 12, in accordance with an embodiment of the present disclosure. The system 10 may include the automated mail tray 12, one or more sensors 14, a controller 16, and an adjustment mechanism 18. The system 10 may utilize the sensors 14 to detect a position/orientation of mail product 20 in the automated mail tray 12. Upon receiving a signal from the sensors 14, the controller 16 may determine that the mail product 20 has fallen over within the mail tray 12. Upon making this determination, the controller 16 may output a control signal to the adjustment mechanism 18 and/or an actuator 22 to adjust a position of the mail product 20 back into the desired vertical position. To aid in the transfer of mail product 20 to or from the automated mail tray 12, the mail tray 12 may include a moveable bottom surface 24 for supporting the mail product 20. These and other features will be described in detail below.

The mail tray 12 may include four side walls 26 connected to each other and disposed around the bottom surface 24 to define the external bounds of the mail tray 12. The bottom surface 24 of the mail tray 12 may be moveable relative to the side walls 26. For example, FIGS. 2A-2C illustrate an embodiment of the mail tray 12 with a moveable bottom surface 24 being moved into different positions and orientations relative to the side walls 26.

Figure 2A:
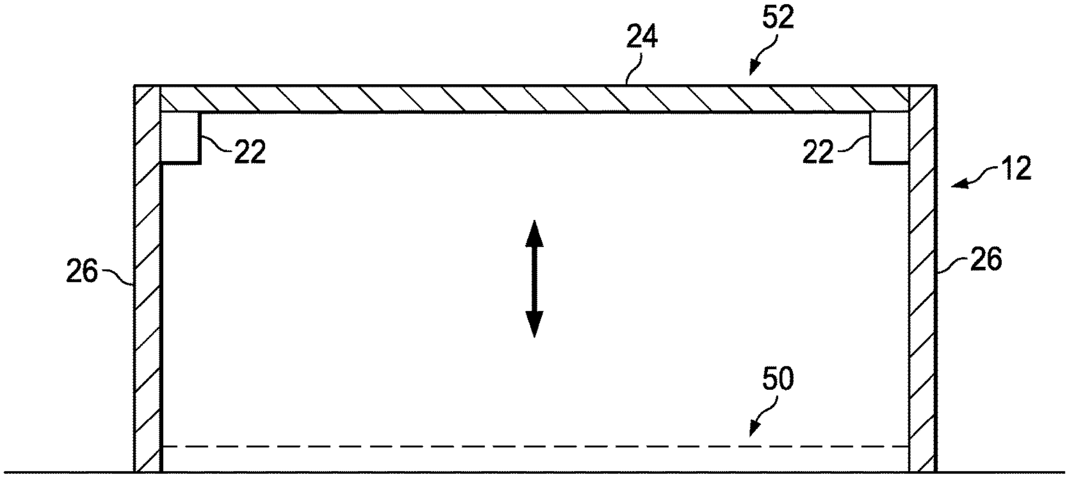
FIGS. 2A-2C are schematic cross-sectional views of an automated mail tray with a moveable bottom surface, in accordance with an embodiment of the present disclosure.

FIG. 2A illustrates an automated mail tray 12 having a bottom surface 24 that is moveable between a lowered position 50 and an upper position 52. The bottom surface 24 may be moved vertically up and down (elevated/lowered) between these two positions as desired. As shown, the bottom surface 24 may remain in a substantially flat horizontal plane (i.e., perpendicular to the side walls 26) when in both the lowered position 50 and in the upper position 52. The bottom surface 24 may be generally aligned with an upper edge of the side walls 26 of the automated mail tray 12 when the bottom surface 24 is held in the elevated position 52.

In some embodiments, the moveable bottom surface 24 may be raised by exerting force under the bottom surface 24 and held in place while mail is being loaded onto or swept off the bottom surface 24. In some embodiments, the automated mail tray 12 may include an actuation mechanism 22 that automatically lifts the bottom surface 24 relative to the side walls 26 of the mail tray 12. In other embodiments, a shelf or other component upon which the automated mail tray 12 is disposed may feature an actuation mechanism (not shown) that selectively pushes up against the bottom surface 24 to move the bottom surface 24 to the elevated position 52 relative to the side walls 26 of the mail tray 12. Other mechanisms may be utilized in other embodiments for automatically moving the bottom surface 24 of the mail tray 12 between the lowered position 50 and the upper position 52.

Figure 2B:
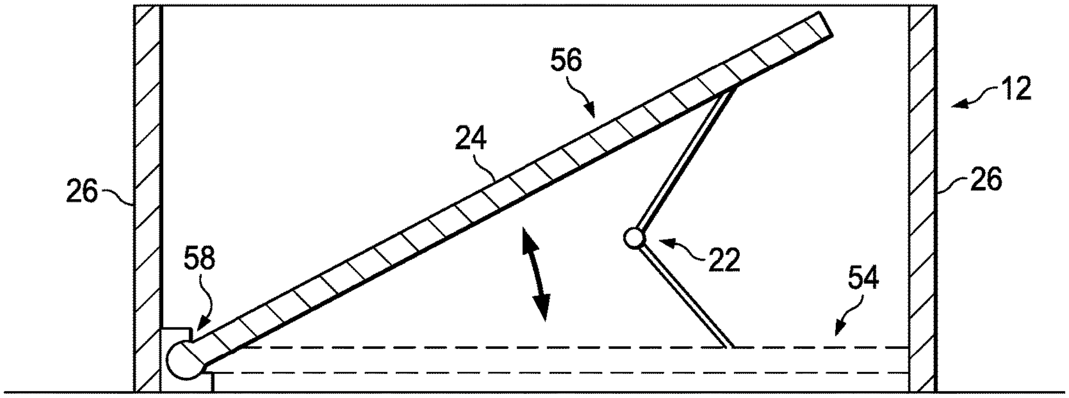
Figure 2C:
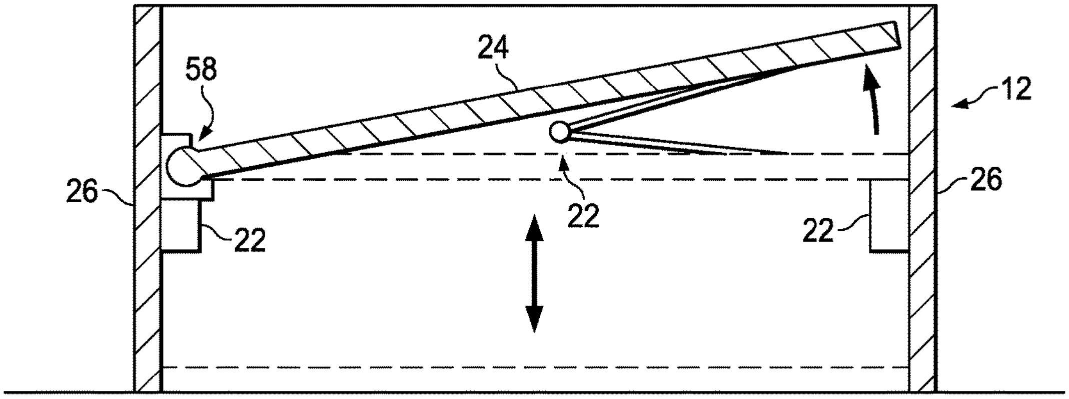

In some embodiments, the bottom surface 24 of the automated mail tray 12 may be designed to pivot between a level position 54 (e.g., perpendicular to the side walls 26) and an angled position 56, as shown in FIG. 2B. In the angled position 56, the bottom surface 24 is not substantially perpendicular to the side walls 26. To facilitate this angling of the bottom surface 24 relative to the side walls 26, the automated mail tray 12 may include a pivot slot 58 (or other pivoting point) at one end. The moveable bottom surface 24 may be received into and rotated relative to the pivot slot 58 to bring the bottom surface 24 from the level position 54 to the angled position 56. As mentioned before, the moveable bottom surface 24 may be raised to this angled position 56 by exerting force under the bottom surface 24. For example, the automated mail tray 12 may include an actuation mechanism 22 that automatically lifts a portion of the bottom surface 24 upward to angle the bottom surface 24 relative to the pivot slot 58. In the illustrated embodiment, the actuation mechanism 22 may include a series of mechanical linkages coupled between the bottom surface 24 and a lower portion of the mail tray 12. However, other mechanisms may be used in other embodiments for automatically angling the bottom surface 24 relative to the side walls 26.

In still other embodiments, the automated mail tray 12 may include one or more actuation mechanisms 22 designed to move the bottom surface 24 up and down relative to the side walls 26 and to angle the bottom surface 24 relative to the side walls 26 as desired. That way, the bottom surface 24 can be rotated into a non-perpendicular position relative to the side walls 26 even when the bottom surface 24 is in a vertically elevated position within the mail tray 12. An example of this can be seen in FIG. 2C.

As mentioned above with reference to FIG. 1, the system 10 may utilize one or more sensors 14 for detecting a position of mail product within the automated mail tray 12. These sensors 14 may be optical sensors used to determine whether the mail stack 20 has fallen over within the automated mail tray 12. The sensors 14 may be arranged about the mail tray 12 so that they are able to see through the mail tray 12 at specific intervals.

Figure 3:
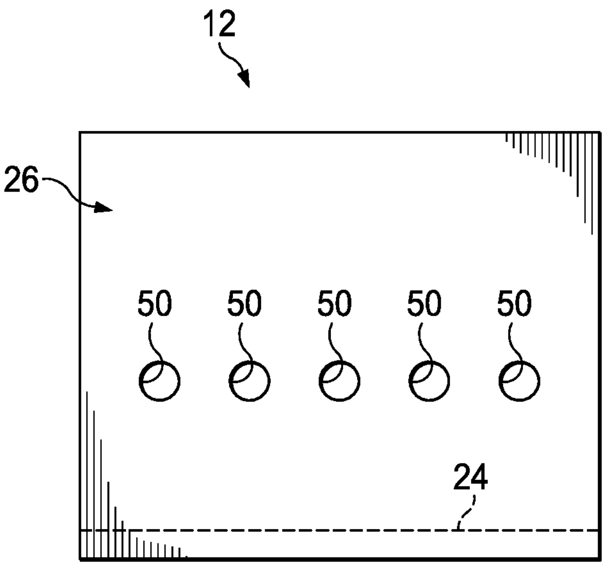
FIG. 3 is a schematic side view of an automated mail tray, in accordance with an embodiment of the present disclosure.

As illustrated in FIG. 3, for example, the automated mail tray 12 may include holes 50, slots, or similar openings formed in one or more side walls 26 of the mail tray 12. The optical sensors 14 may be positioned so that they can see through the holes 50 in the mail tray 12 to detect a position of the mail contents 20 in the tray 12. The sensors 14 could also be used to determine a quantity of the mail contents 20 (e.g., how many pieces of mail or the volume of mail product) present in the automated mail tray 12. In some embodiments, the sensors 14 may also be used to detect a position and/or angle of the moveable bottom surface 24 of the mail tray 12 relative to the side walls 52. In addition to (or in lieu of) the holes 50 or other openings in the side walls 26, the mail tray 12 may include holes, slots, or similar openings formed in the bottom surface 24 of the mail tray 12 to facilitate detection of a position or orientation of the tray contents 20 using sensors 14 disposed proximate the bottom surface 24.

Returning to FIG. 1, feedback from the one or more sensors 14 may be interpreted by the controller 16 to determine whether the mail product 20 in the automated mail tray 12 is in an upright (vertical) position. If the controller 16 determines that the mail product 20 has fallen from a desired vertical orientation, the controller 16 may output control signals to one or more actuation components to adjust the position of the mail product 20 in the mail tray 12. More specifically, the controller 16 may actuate the adjustment mechanism 18 to move the mail product back into a vertically oriented stack.

Figure 4:
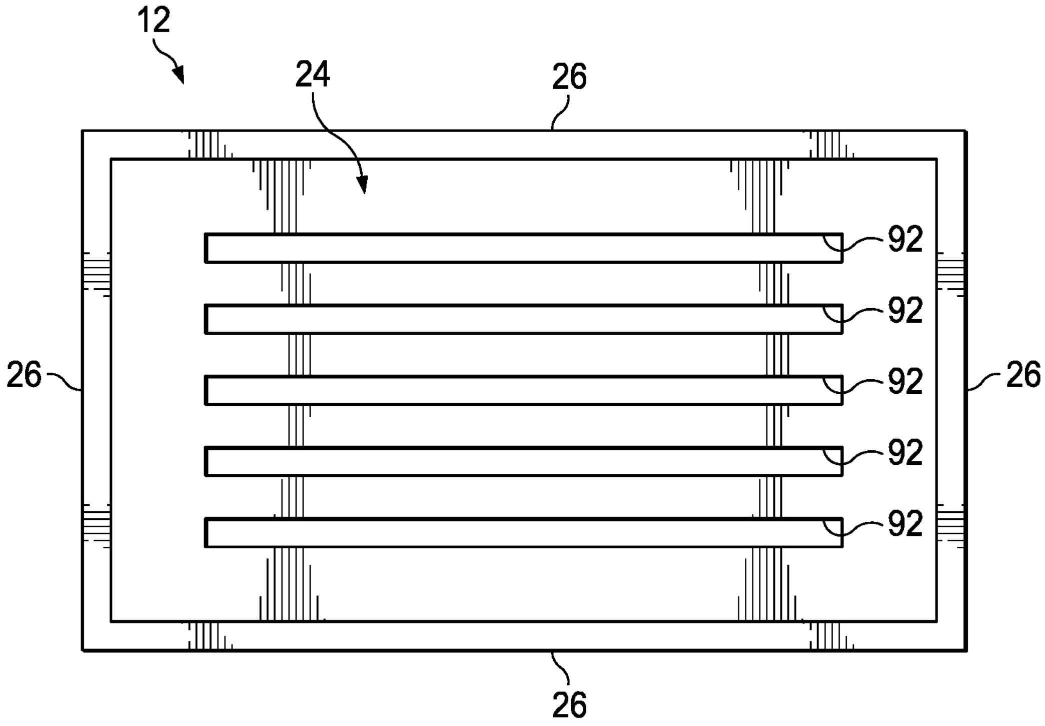
FIG. 4 is a schematic bottom view of an automated mail tray, in accordance with an embodiment of the present disclosure.

Upon a determination that the mail product 20 in the automated mail tray 12 has fallen over, an adjustment mechanism 18 as shown in FIG. 1 can be actuated to move the mail product 20 back into a vertical orientation. The adjustment mechanism 18 may be a component that is separate from the automated mail tray 12. In some embodiments, the adjustment mechanism 18 may include a plurality of alignment fingers 90 that are designed to be inserted through slots formed in the bottom surface 24 of the mail tray 12. FIG. 4 is a bottom view of the automated mail tray 12 showing five slots 92 formed therein, and these slots 92 may allow the insertion of the alignment fingers 90 of the adjustment mechanism 18 used to reposition mail product 20 in the mail tray 12. The alignment fingers 90 may adjust the contents 20, if present, into a vertical position so that the bottom surface 24 can be actuated upward to elevate the contents 20 out of the mail tray 12. This allows the mail contents 20 to be moved from the tray 12 into other automation equipment without interference from the side walls 26 of the mail tray 12.

Figure 5A:
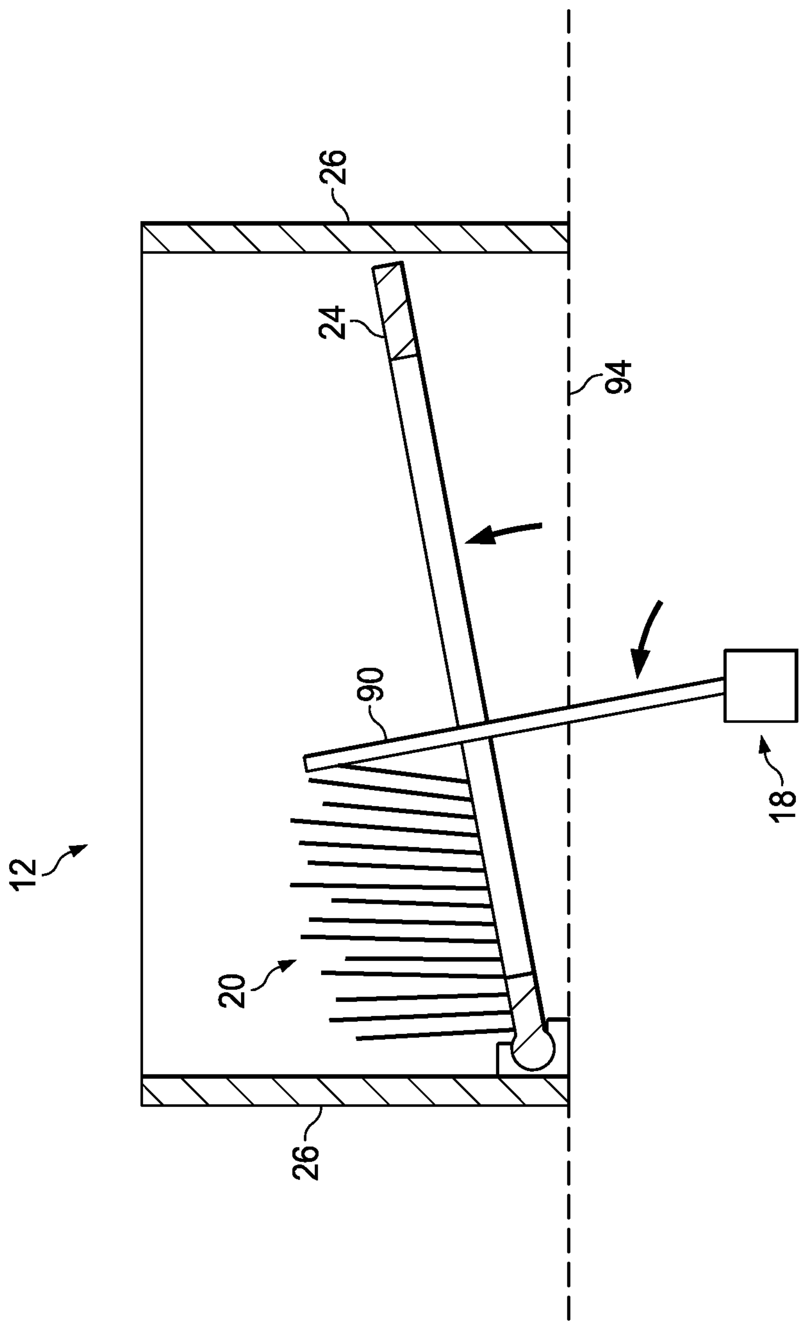
FIGS. 5A-5C are schematic cross-sectional views of an automated mail tray and adjustment features being used to adjust a position of contents in the mail tray, in accordance with an embodiment of the present disclosure.

In addition, the controller 16 may also output a control signal to one or more actuators 22 of the automated mail tray 12 to aid the adjustment mechanism 18 in repositioning mail product 20 that has fallen over in the mail tray 12. Specifically, the controller 16 may actuate the automated mail tray 12 to adjust the angle of the bottom surface 24 of the tray 12 relative to level (i.e., a horizontal plane 94). Such movement of the bottom surface 24 may aid in the adjustment of the position of mail contents 20 within the tray 12. This movement may be accomplished by actuating the bottom surface 24 relative to the side walls 26 of the automated mail tray 12, as shown in FIG. 5A. This movement of the bottom surface 24 may be performed along with actuation of the adjustment feature 18 so that the alignment fingers 90 are able to adjust the position of the mail contents 20. The bottom surface 24 may be tilted to a desirable angle for allowing the alignment fingers 90 to contact and lift the fallen mail product 20 to a vertical orientation. Once the mail contents 20 are vertical, the controller 16 may actuate the mail tray 12 to move the bottom surface 24 up into a perpendicular position relative to the side walls 26, as shown in FIG. 5C. This may position the bottom surface 24 so that the mail contents 20 can be slid off the end of the tray 12 without interference from the side walls 26.

Figure 5B:
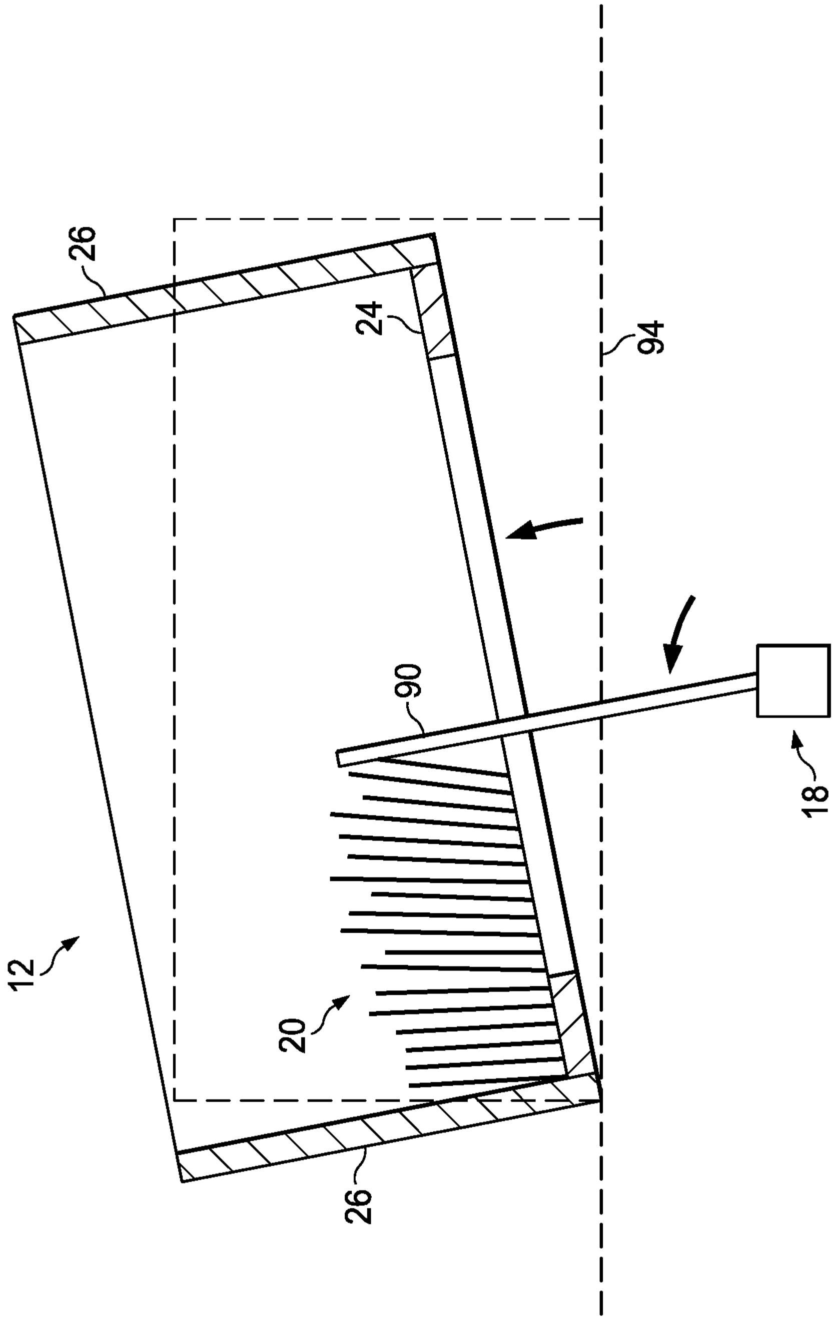
Figure 5C:
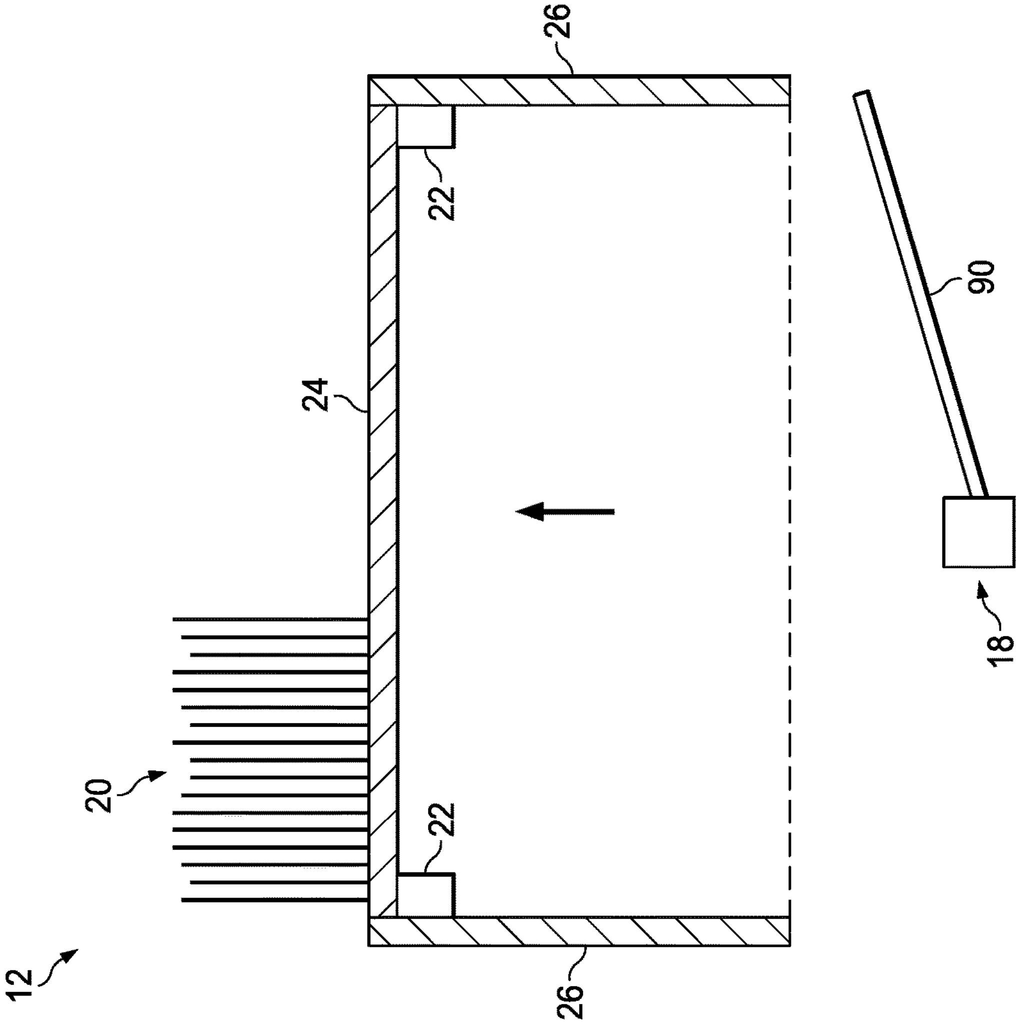

In other embodiments, the automated mail tray 12 may be moved as a composite whole into a position where the bottom surface 24 is disposed at an angle relative to a horizontal plane 94, as shown in FIG. 5B. This movement of the automated tray 12 may be performed along with actuation of the adjustment feature 18 so that the alignment fingers 90 are able to adjust the position of the mail contents 20. The mail tray 12 (and consequently bottom surface 24) may be tilted to a desirable angle for allowing the alignment fingers 90 to contact and lift the fallen mail product 20 to a vertical orientation. Once the mail contents 20 are vertical, the controller 16 may actuate the mail tray 12 back to a level position, while maintaining the mail contents in a vertical position using the alignment fingers 90. The controller 16 may then actuate the mail tray 12 to move the bottom surface 24 up to the upper level of the side walls 26 (FIG. 5C), allowing the mail contents 20 to be slid off the end of the tray 12 without interference from the side walls 26.

Turning back to FIG. 1, a general method for operating the disclosed mail adjustment system 10 will now be described. The automated mail tray 12 may allow access from the side walls 26 and/or from the bottom surface 24 for one or more sensors 14 to detect the position or movement of mail product 20 within the mail tray 12. The sensors 14 may communicate signals to the controller 16, which determines based on the sensor feedback whether the mail product 20 is in a vertical stack. If the controller 16 determines that the mail product 20 is no longer in a vertical stack, the controller 16 may control various components of the system 10 (e.g., adjustment mechanism 18, actuators 22 of the mail tray 12, etc.) to bring the mail stack 20 back into a vertical orientation relative to the tray bottom.

The controller 16 may use the information received from the sensors 14 to determine an angle for actuating the bottom surface 24 of the tray 12 as well as a desired movement of the alignment fingers 90 through slots 92 in the bottom surface 24 of the tray 12. The bottom surface 24 of the tray 12 may be angled either relative to the side walls 26, or the entire tray 12 may be angled relative to a horizontal plane 94, as described with reference to FIGS. 5A and 5B. The controlled angle of the bottom surface 24 relative to the horizontal plane 94 and movement of the alignment fingers 90 through the slots 92 may facilitate the movement of mail product 20 back into a vertical position. Once the mail product 20 is back in the vertical position, the bottom surface 24 can be moved up relative to the side walls 26 of the tray 12 (as shown in FIG. 5C) and the mail product 20 can be moved forward onto a load ledge that is at the same position as the elevated bottom surface 24 without damage or order issues.

Another embodiment of the system 10 for adjusting mail product 20 in an automated mail tray 12 is illustrated in FIGS. 6A-6F. In the illustrated embodiment, the system 10 does not utilize sensors to detect a position of the mail product 20. Instead, the system 10 works to automatically ensure that the mail product 20 is in a desired vertical position before it is moved out of the mail tray 12. In this embodiment, the system 10 includes the automated mail tray 12, an adjustment mechanism 110 used to adjust the mail product 20 toward a vertical position, and a pair of automated paddles 112 used to sweep the vertically oriented mail product 20 out of the mail tray 12.

As illustrated, the automated mail tray 12 may hold mail product 20 that does not entirely fill the tray 12. The mail product 20, therefore, may fall away from a vertical position in the automated mail tray 12. The adjustment mechanism 110 may be used to move the mail product 20 back toward a desired vertical position. In some embodiments, the automated mail tray 12 may be lowered down as a unit over the adjustment mechanism 110. In other embodiments, the adjustment mechanism 110 may be actuated upward into engagement with the automated mail tray 12. In either instance, the bottom surface 24 of the mail tray 12 may remain stationary with respect to the side walls 26 of the mail tray 12.

Figure 6A:
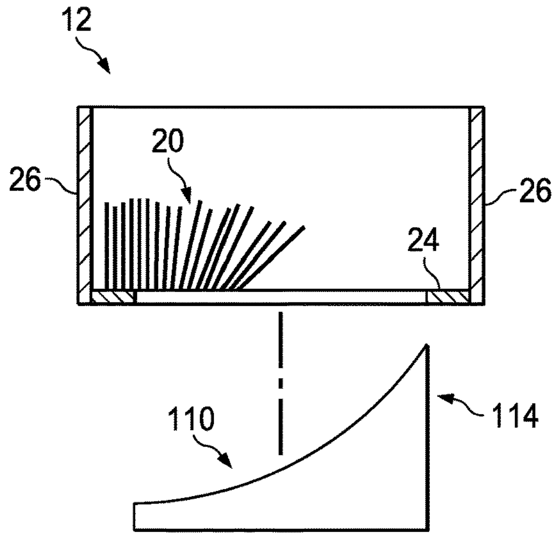
FIGS. 6A-6F are schematic block diagrams illustrating the movement of mail product from an automated mail tray onto a loading ledge using a ramp feature, in accordance with an embodiment of the present disclosure.
Figure 6B:
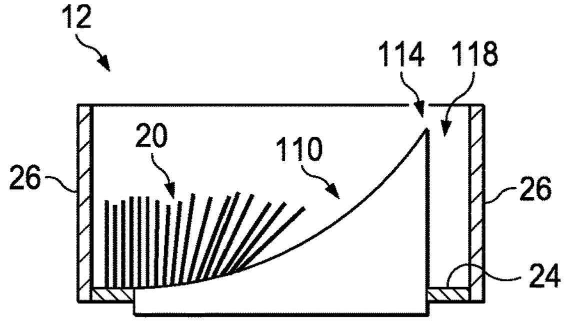
Figure 6C:
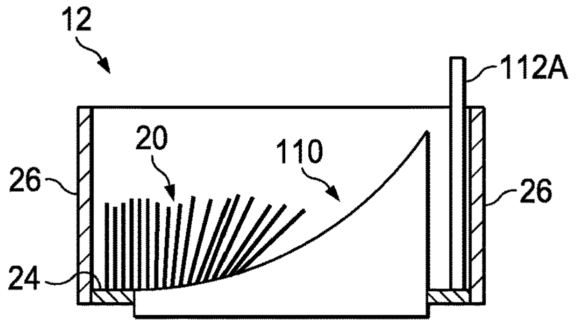

As described above with reference to FIG. 4, the mail tray 12 may include a bottom surface 24 having slots 92 formed therein. The adjustment mechanism 110 of FIGS. 6A-6F may include a set of narrow alignment fingers 116 that are profiled to form a ramp. The ramp shape of the adjustment mechanism 110 engages the mail product 20 in a way that pushes fallen mail product back toward the desired vertical position. Specifically, the adjustment mechanism 110 may be shaped such that the fingers 116 ramp upwards at one end 114, and this end 114 of the adjustment mechanism 110 corresponds to a side of the automated mail tray 12 that is not filled with mail product 20. FIG. 7 is a cross sectional view of the adjustment mechanism 110 interfacing with the automated mail tray 12. As shown, alignment fingers 116 of the ramped adjustment mechanism 110 may extend through corresponding slots 92 in the bottom of the mail tray 12.

Once the mail tray 12 and/or ramped adjustment mechanism 110 have been moved into position to prop up fallen mail product 20, a first automated paddle 112A may be inserted into the automated mail tray 12. As illustrated in FIG. 6C, the paddle 112A may be inserted into a space 118 between the upward facing end 114 of the adjustment mechanism 110 and a side wall 26 of the mail tray 12. The automated paddle 112A may include a set of downward facing alignment fingers 120 designed to be lowered into the space 118 at one end of the mail tray 12. The automated paddle 112A may be a vertically oriented paddle that can be actuated to sweep horizontally through the mail tray 12.

Figure 8:
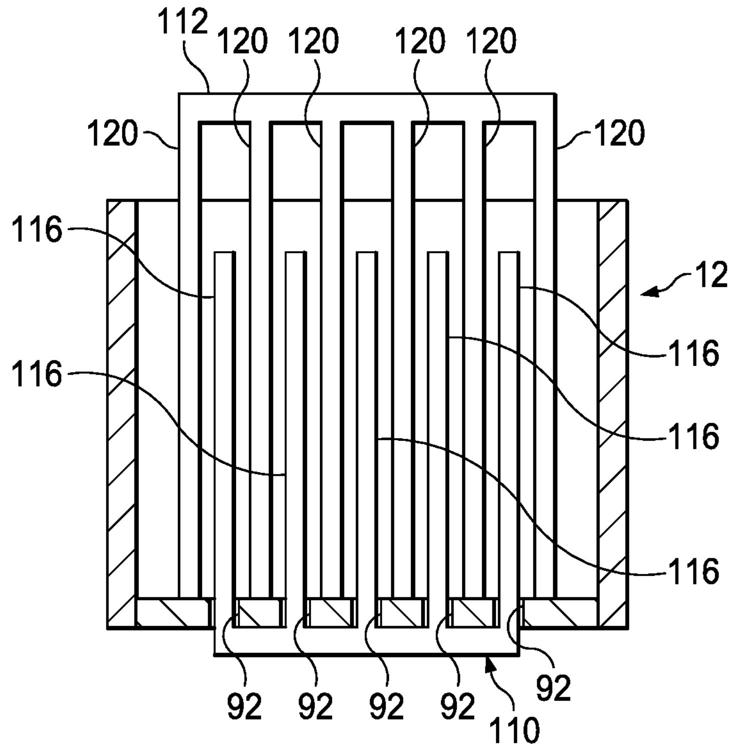
FIG. 8 is a cross sectional view of an automated paddle interfacing with the mail tray and the ramp feature of FIGS. 6A-6F, in accordance with an embodiment of the present disclosure.

FIG. 8 is a cross sectional view of an embodiment of the paddle 112A interfacing with the adjustment mechanism 110 and the mail tray 12. As shown, alignment fingers 120 of the paddle 112A may be disposed between the alignment fingers 116 of the ramped adjustment mechanism 110 within the automated mail tray 12. This enables the automated paddle 112A to be swept through the alignment fingers 116 of the ramped adjustment mechanism 110 to move mail out of the automated mail tray 12.

Figure 6D:
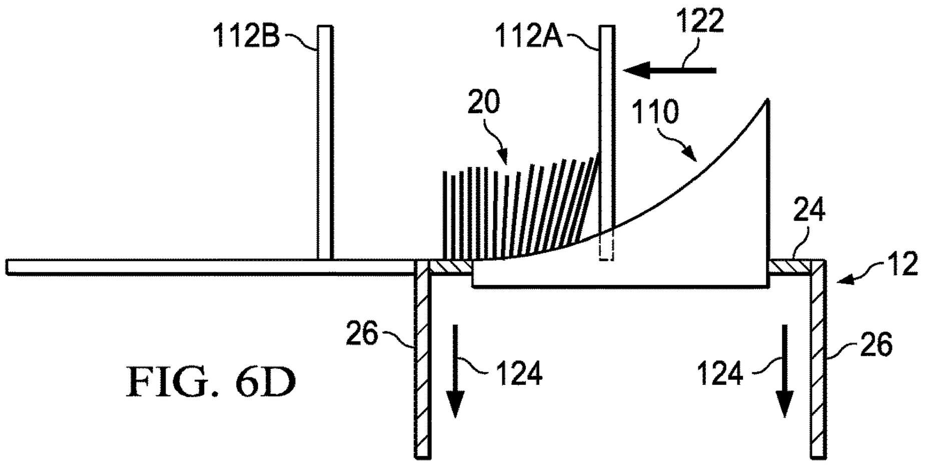
Figure 6E:
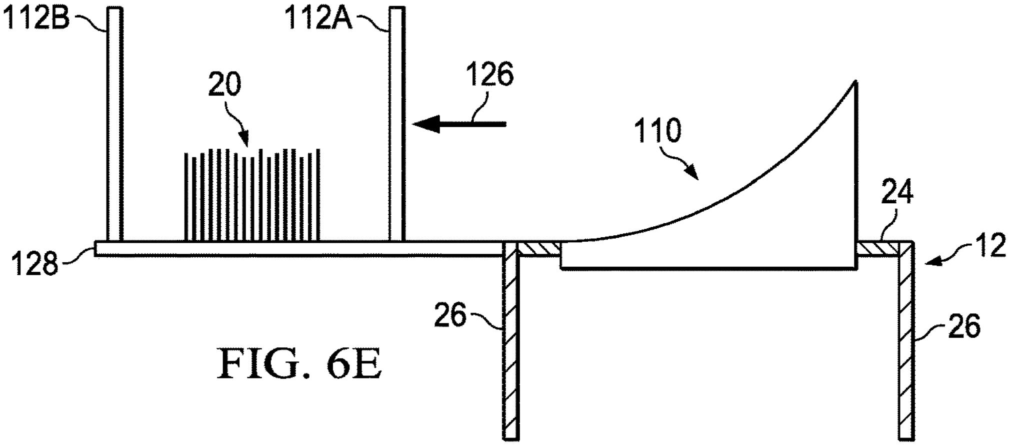
Figure 6F:
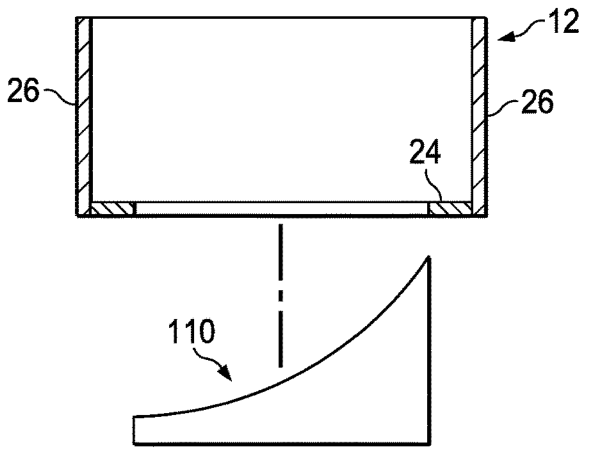
Figure 7:
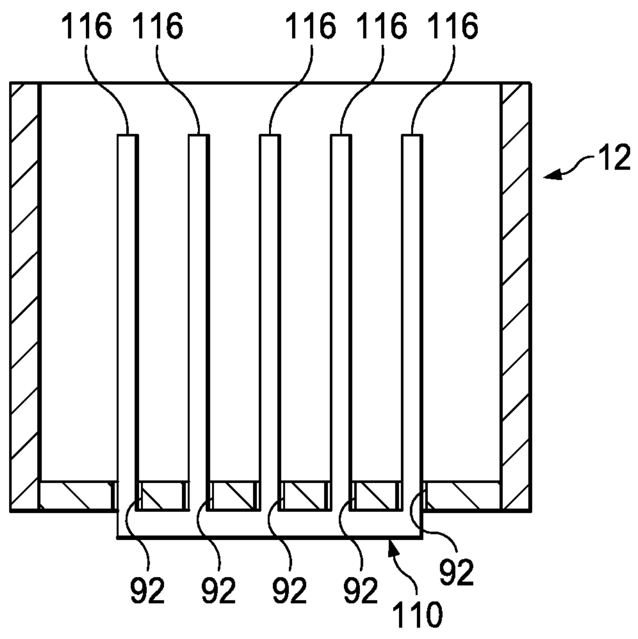
FIG. 7 is a cross sectional view of the mail tray interfacing with the ramp feature of FIGS. 6A-6F, in accordance with an embodiment of the present disclosure.

As shown in FIG. 6D, once disposed in the space 118, the automated paddle 112A may be swept through the mail tray 12 (arrow 122). As mentioned above, the adjustment mechanism 110 may generally prop up the mail product 20 so that it is not in a horizontal position. Upon engaging the mail product 20 in the mail tray 12, the paddle 112A may force the mail product 20 into a fully vertical position. Once the paddle 112A engages the mail product 20, the side walls 26 of the tray 12 may be actuated in a downward direction (arrows 124) relative to the bottom surface 24 of the mail tray 12. This is generally the same movement as actuating the bottom surface 24 of the mail tray 12 upward relative to the side walls 26, as described above.

A second automated paddle 112B may be disposed or pre-set at an end of the mail tray 12 (opposite the first paddle 112A) to keep the mail product 20 in a vertical position after the downward actuation of the side walls 26. The first paddle 112A may be moved relative to the second paddle 112B until the mail product 20 is held in a vertical position between the two automated paddles 112. At this point, the paddles 112 may move together (arrow 126) off the bottom surface 24 of the mail tray 12, thereby moving the vertical mail product 20 out of the mail tray 12 and onto a processing load ledge 128. Once the mail product 20 is removed from the mail tray 12 in this manner, the mail tray 12 and/or the adjustment mechanism 110 may be actuated to return the mail tray 12 to its original position and out of engagement with the adjustment mechanism 110. From this position, the process may be repeated with a new load of mail product.

Although the present disclosure and its advantages have been described in detail, it should be understood that various changes, substitutions and alterations can be made herein without departing from the spirit and scope of the disclosure as defined by the following claims.

What is claimed is:

1. A system, comprising:

an automated mail tray comprising four side walls and a bottom surface that is moveable relative to the four side walls, wherein the bottom surface comprises slots formed therein; and an adjustment mechanism disposed beneath the automated mail tray and comprising alignment fingers configured to be disposed through the slots in the bottom surface to adjust a position of contents in the automated mail tray.

2. The system of claim 1, further comprising at least one sensor positioned proximate the automated mail tray to detect a position of the contents in the automated mail tray and/or a position of the bottom surface of the automated mail tray.

3. The system of claim 2, further comprising one or more openings formed through the automated mail tray, wherein the at least one sensor is an optical sensor positioned to take measurements through the one or more openings.

4. The system of claim 3, wherein the one or more openings are formed through one or more of the four sides walls of the automated mail tray.

5. The system of claim 3, wherein the one or more openings are formed through the bottom surface.

6. The system of claim 2, further comprising a controller communicatively coupled to the at least one sensor and to the adjustment feature, wherein the controller is configured to determine whether the contents of the automated mail tray have fallen from a vertical position and to output a control signal for actuating the adjustment feature to adjust the contents back to the vertical position.

7. The system of claim 6, wherein the controller is communicatively coupled to an actuator for moving the bottom surface of the automated mail tray, wherein the controller is configured to output a control signal to the actuator for moving the bottom surface to adjust the contents back to the vertical position.

8. The system of claim 1, wherein the bottom surface is moveable in a vertical direction relative to the four side walls while remaining substantially perpendicular to the four side walls.

9. The system of claim 1, wherein the automated mail tray comprises a pivot slot, wherein one end of the bottom surface is disposed in the pivot slot to enable movement of the bottom surface into a position that is not substantially perpendicular to the four side walls.

10. The system of claim 1, wherein the alignment fingers of the adjustment feature are profiled to form a ramp.

11. The system of claim 1, further comprising a pair of paddles disposed above the automated mail tray and comprising alignment fingers configured to be swept through the alignment fingers of the adjustment feature to move the contents out of the automated mail tray.

12. A method, comprising:

receiving mail contents into an automated mail tray comprising four side walls and a bottom surface that is moveable relative to the four side walls;

actuating an adjustment mechanism by moving the adjustment mechanism relative to the bottom surface of the automated mail tray; and moving the contents in the automated mail tray into a vertical position via the adjustment mechanism.

13. The method of claim 12, wherein the adjustment mechanism comprises alignment fingers, and wherein actuating the adjustment mechanism comprises rotating the alignment fingers through slots in the bottom surface of the automated mail tray.

14. The method of claim 12, further comprising moving the bottom surface of the automated mail tray relative to the four side walls into a position that is at or above an upper level of the four side walls and perpendicular to the four side walls.

15. The method of claim 12, further comprising:

sensing a position of the contents in the automated mail tray; and actuating the adjustment mechanism via a control signal in response to determining that the contents are not in the vertical position.

16. The method of claim 15, further comprising sensing a position of the bottom surface of the automated mail tray.

17. The method of claim 15, further comprising actuating the bottom surface of the automated mail tray to move the bottom surface with respect to a horizontal plane in response to determining that the contents are not in the vertical position.

18. The method of claim 17, wherein actuating the bottom surface of the automated mail tray comprises rotating the bottom surface of the automated mail tray relative to the side walls of the automated mail tray.

19. The method of claim 17, wherein actuating the bottom surface of the automated mail tray comprises rotating the entire automated mail tray relative to the horizontal plane.

20. The method of claim 12, further comprising:

moving the automated mail tray relative to the adjustment mechanism, wherein the adjustment mechanism comprises a set of alignment fingers formed into a ramp structure, such that the alignment fingers extend through slots in a bottom surface of the automated mail tray;

moving the side walls of the automated mail tray relative to the bottom surface of the mail tray; and sweeping the contents out of the automated mail tray via paddles comprising alignment fingers positioned in spaces between the alignment fingers of the adjustment mechanism.

* * * * *